United States Patent
Zhang et al.

(10) Patent No.: US 9,918,284 B2
(45) Date of Patent: Mar. 13, 2018

(54) METHODS AND SYSTEMS FOR DOWNLINK TRANSMIT POWER CONTROL COMMAND TRANSMISSION

(71) Applicant: Futurewei Technologies, Inc., Plano, TX (US)

(72) Inventors: Peng Zhang, Shanghai (CN); Carmela Cozzo, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/270,900

(22) Filed: Sep. 20, 2016

(65) Prior Publication Data

US 2017/0086147 A1    Mar. 23, 2017

Related U.S. Application Data

(60) Provisional application No. 62/222,641, filed on Sep. 23, 2015.

(51) Int. Cl.
| | |
|---|---|
| *H04W 52/38* | (2009.01) |
| *H04W 52/24* | (2009.01) |
| *H04W 72/04* | (2009.01) |
| *H04W 52/22* | (2009.01) |
| *H04W 52/44* | (2009.01) |
| *H04W 52/58* | (2009.01) |
| *H04W 52/28* | (2009.01) |

(52) U.S. Cl.
CPC ....... *H04W 52/245* (2013.01); *H04W 52/221* (2013.01); *H04W 52/44* (2013.01); *H04W 52/58* (2013.01); *H04W 72/0413* (2013.01); *H04W 72/0446* (2013.01); *H04W 52/283* (2013.01)

(58) Field of Classification Search
CPC .............................. H04W 52/38; H04W 52/04
USPC ................ 455/522, 69, 452.1, 509
See application file for complete search history.

(56) References Cited

U.S. PATENT DOCUMENTS

| | | | | |
|---|---|---|---|---|
| 2007/0165620 A1* | 7/2007 | Li | ........... | H04B 1/7105 |
| | | | | 370/376 |
| 2008/0039128 A1* | 2/2008 | Ostman | ........... | H04W 52/54 |
| | | | | 455/522 |
| 2009/0181710 A1* | 7/2009 | Pani | ........... | H04W 52/38 |
| | | | | 455/509 |

FOREIGN PATENT DOCUMENTS

| | | |
|---|---|---|
| CN | 101729107 A | 6/2010 |
| CN | 102958148 A | 3/2013 |
| JP | 2009159247 A | 7/2009 |
| WO | 2015118510 A1 | 8/2015 |

* cited by examiner

*Primary Examiner* — John J Lee
(74) *Attorney, Agent, or Firm* — Slater Matsil, LLP

(57) ABSTRACT

Backwards compatibility may be achieved by transmitting an alternating pattern of uplink TPC commands in uplink timeslots. In one example, a served user equipment (UE) receives a downlink TPC command from a serving base station during a downlink timeslot in a sequence of downlink timeslots, and generates an uplink TPC command based on a received power level of the downlink TPC command. The served UE may then transmit the uplink TPC command in an uplink timeslot mapped to the downlink timeslot in which the downlink TPC command was received, as well as transmit an alternating pattern of uplink TPC commands in other uplink timeslots. The alternating pattern of uplink TPC commands may cause a neighboring base station to effectively maintain its transmit power level.

20 Claims, 9 Drawing Sheets

METHODS AND SYSTEMS FOR DOWNLINK TRANSMIT POWER CONTROL COMMAND TRANSMISSION

This patent application claims priority to U.S. Provisional Application No. 62/222,641, filed on Sep. 23, 2015 and entitled "Methods and Systems for Downlink Transmit Power Control Command Transmission," which is hereby incorporated by reference herein as if reproduced in its entirety.

TECHNICAL FIELD

The present invention relates to telecommunications, and, in particular embodiments, to methods and systems for downlink transmit power control command transmission.

BACKGROUND

Wide code division multiple access (WCDMA) is a spread-spectrum modulation technique commonly used in mobile broadband networks. When using WCDMA, a transmitter encodes a channel in such a way that a receiver, knowing the code, can pick out the wanted signal from other signals communicated over the same band. Improvements in WCDMA are needed to accommodate the increased throughput demands of next generation mobile broadband networks.

SUMMARY OF THE INVENTION

Technical advantages are generally achieved, by embodiments of this disclosure which describe methods and systems for downlink transmit power control command transmission.

In accordance with an embodiment, a method for communicating transmit power control (TPC) commands is provided. In this example, the method includes receiving a downlink TPC command from a serving base station during a first downlink timeslot in a sequence of downlink timeslots, generating an uplink TPC command according to a received power level of the downlink TPC command, and transmitting the uplink TPC command in a first uplink timeslot in a sequence of uplink timeslots. The first uplink timeslot is mapped to the first downlink timeslot in which the downlink TPC command was received from the serving base station. The method further includes transmitting an alternating pattern of TPC commands over other uplink timeslots in the sequence of uplink timeslots. An apparatus for performing this method is also provided.

In accordance with another embodiment, a method for generating transmit power control (TPC) commands in an uplink Dedicated Physical Control Channel (DPCCH) when a serving radio link is configured with Algorithm 3 is provided. In this example, the method includes receiving, by a user equipment (UE), a downlink TPC command over the serving radio link, generating one uplink TPC command based on the downlink TPC command in a first timeslot in a sequence of timeslots, and generating a pattern of uplink TPC commands in other timeslots following the sequence of timeslots. If a length a slot cycle is 3, then the pattern of uplink TPC commands consists of a first TPC command having a value of 0 followed by a second TPC command having a value of 1. If a length a slot cycle is 5, then the pattern of uplink TPC commands consists of a first TPC command having a value of zero, followed by a second TPC command having a value of 1, followed by a third TPC command having a value of 0, followed by a fourth TPC command having a value of 1. An apparatus for performing this method is also provided.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

Figure 1:
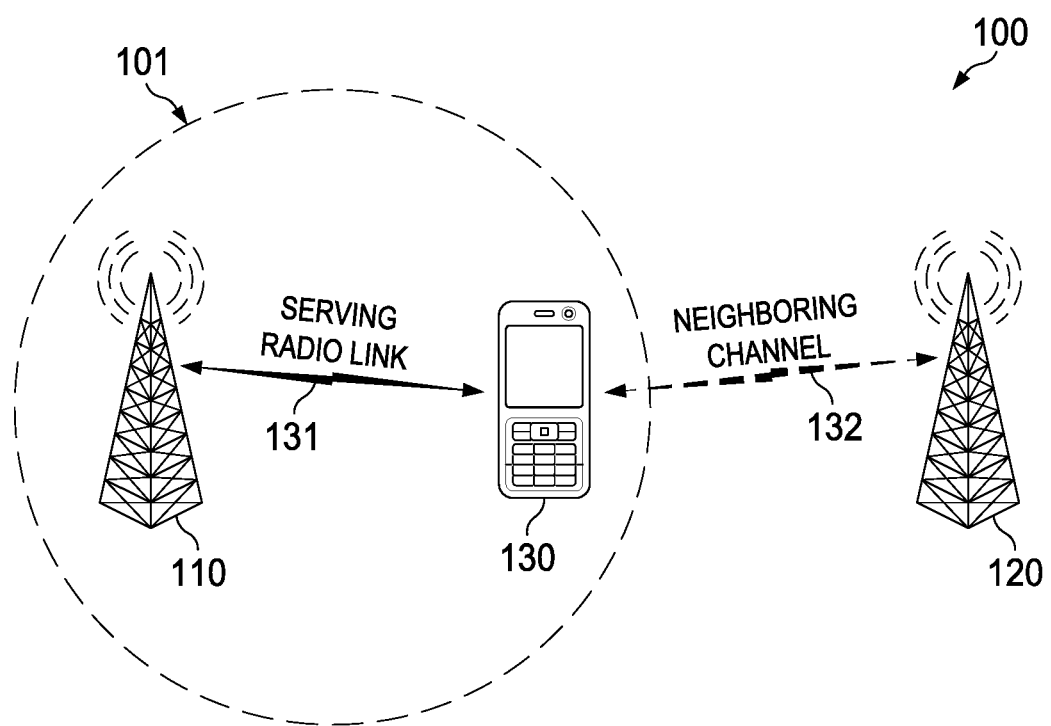
FIG. 1 illustrates a diagram of an embodiment wireless communications network.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

A serving base station may exchange uplink and downlink transmit power control (TPC) commands with a served user equipment (UE) to adjust downlink transmit power levels over a WCDMA radio interface. In particular, a serving base station may transmit a downlink TPC command in a downlink timeslot. A served UE may then receive the downlink TPC command from the serving base station, generate an uplink TPC command based on a received power level of the downlink TPC command, and transmit the uplink TPC command in an uplink timeslot that is mapped to, or otherwise associated with, the downlink timeslot over which the downlink TPC command was received. The uplink TPC command may instruct the serving base station to adjust (e.g., increase or decrease) its downlink transmit power level based on the received power level of the downlink TPC command, which may correspond to a variation in channel quality of the serving radio interface over time.

TPC commands may also be exchanged between the served UE and neighboring base stations that are not currently serving the UE in order to mitigate inter-cell interference. In particular, a neighboring base station may transmit TPC power control commands to a UE that instructs the UE to reduce an uplink transmit power level when uplink transmissions of the UE are producing too much interference in the neighboring cell. Additionally, the uplink TPC commands transmitted from the served UE to the serving base station may also be received by the neighboring base station, and used by the neighboring base station to adjust its own downlink transmit power level (i.e., the power level used to communicate the downlink TPC command from the neighboring base station to the served UE). It may be beneficial to regulate a neighboring base station's transmit power level according to an uplink TPC command (that is generated to regulate transmit power over the serving radio link) because a channel quality of the serving radio interface may be somewhat correlated with a channel quality of an interference channel between the neighboring base station and the served UE due to the fact that both air interfaces are oftentimes affected by the same obstruction, e.g., a building, a user's head/hand, etc. By way of example, if a serving UE enters a vehicle or an elevator, then it is likely that both the serving radio interface and the interference channels will experience increased attenuation.

In conventional networks, base stations may transmit downlink TPC commands in each downlink timeslot, as well as receive uplink TPC commands in each uplink timeslot. If an uplink TPC command is not received, then a legacy base station may perceive that an error has occurred. In next-generation networks, base stations may reduce overhead by communicating downlink TPC commands less frequently (e.g., every third timeslot, every fifth timeslot) in situations where the serving radio interface is relatively stable, e.g., when a UE is exhibiting low mobility, etc. This mode may be referred to as "Algorithm 3" such that when Algorithm 3 is configured on the serving radio link, a downlink TPC command is once every three or five downlink timeslots depending on the slot cycle.

This may create a backwards compatibility problem when a next-generation base station is deployed near a legacy base station because served UEs generally only generate uplink TPC commands in response to receiving a downlink TPC command. In particular, when a next-generation base station configures Algorithm 3 on a serving radio link, a served UE would generally only communicate an uplink TPC command every third or fifth uplink timeslot. This may cause neighboring legacy base stations, which expect to detect an uplink TPC command in every uplink timeslot, to perceive an error condition in uplink timeslots over which uplink TPC command are not transmitted by the served UE.

Embodiments of the disclosure address the above-mentioned backwards compatibility problem by transmitting an alternating pattern of uplink TPC commands in uplink timeslots that are not mapped to a downlink timeslot over which a downlink TPC command was transmitted. In one example, a served UE receives a downlink TPC command from a serving base station during a downlink timeslot in a sequence of downlink timeslots, and generates an uplink TPC command based on a received power level of the downlink TPC command. Downlink TPC commands may not be communicated by the serving base station in other downlink timeslots in the sequence of downlink timeslots. The served UE may then transmit the uplink TPC command in an uplink timeslot mapped to the downlink timeslot in which the downlink TPC command was received, as well as transmit an alternating pattern of uplink TPC commands in other uplink timeslots that are mapped to downlink timeslots in which no downlink TPC command was received from the serving base station. The alternating pattern of uplink TPC commands may instruct a neighboring base station to alternate between increasing and decreasing a downlink transmit power level of the neighboring base station by a fixed amount (e.g., +/− one decibel (dB)) during consecutive downlink timeslots. By way of example, if the serving base station transmits a downlink TPC command every third timeslot, then the served UE may transmit a first uplink TPC command based on the received power of the downlink TPC command in a corresponding uplink timeslot, and then a second uplink TPC command and a third uplink TPC command indicating a decrease of one dB and an increase of one dB (respectively) in the next two uplink timeslots. The second uplink TPC command and the third uplink TPC command would effectively maintain the transmit power level of neighboring legacy base stations, as well as prevent them from detecting an error condition. The second uplink TPC command and the third uplink TPC command would either go undetected or be ignored by the serving next-generation base station. These and other aspects are explained in greater detail below.

FIG. 1 illustrates a network 100 for communicating data. The network 100 comprises a serving base station 110 having a coverage area 101, a neighboring base station 120, a user equipment (UE) 130. As shown, a serving radio link 131 extends between the serving base station 110 and the UE 130, and a neighboring channel 132 extends between the neighboring base station 120 and the UE 130. The neighboring channel 132 may be any synchronized or unsynchronized channel between the UE 130 and the neighboring base station, such as an idle air interface or an interference channel. As used herein, the term "base station" refers to any component (or collection of components) configured to provide wireless access to a UE, such as an enhanced base station (eNB), a macro-cell, a femtocell, a Wi-Fi access point (AP), or other wirelessly enabled devices. Base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac, etc. As used herein, the term "UE" refers to any component (or collection of components) capable of establishing a wireless connection with a base station, such as LTE-enabled UEs, Wi-Fi mobile station (STAs), and other wirelessly enabled devices. In some embodiments, the network 100 may comprise various other wireless devices, such as relays, low power nodes, etc.

The UE 130 and serving base station 110 may exchange TPC commands to regulate transmit power levels used to communicate signals over the serving radio link 131. Likewise, the UE 130 and neighboring base station 110 may exchange TPC commands to regulate inter-cell-interference experienced by the neighboring base station 110 as a result of uplink transmissions of the UE 130.

In some embodiments, the serving base station 110 configures Algorithm 3 on the serving radio link 131 such that downlink TPC commands are communicated in fewer than all downlink timeslots, and the UE 130 is adapted to communicate an alternating pattern of uplink TPC commands in uplink timeslots that map to downlink timeslots in which the serving base station 110 does not communicate a downlink TPC command. This may prevent the neighboring base station 120 from detecting an error condition when the neighboring base station 120 is a legacy base station.

Figure 2:
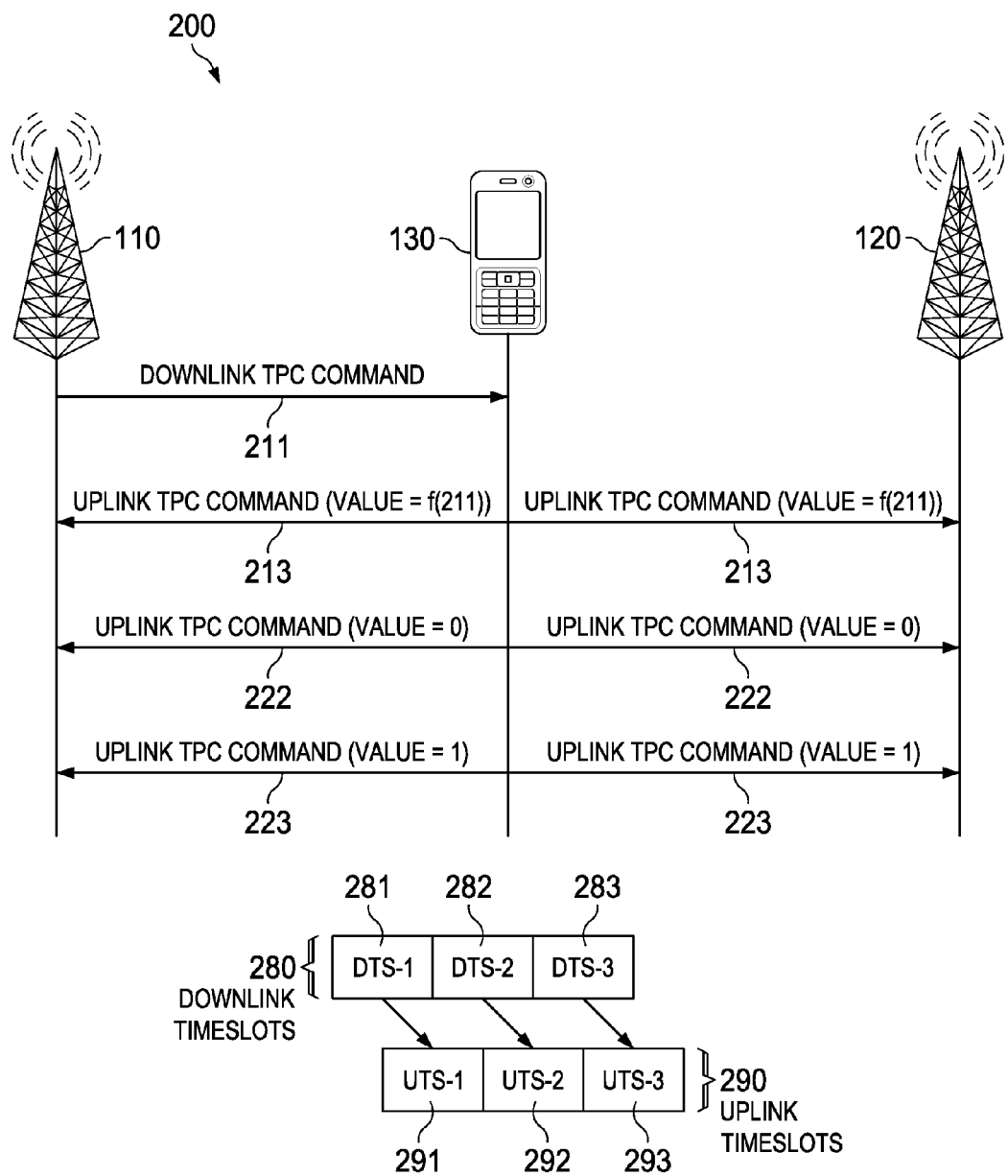
FIG. 2 illustrates a protocol diagram of an embodiment communications sequence for supporting a backwards compatible discontinuous downlink TPC command scheme.

FIG. 2 illustrates an embodiment communications sequence 200 for supporting a backwards compatible discontinuous downlink TPC command scheme. In this example, the serving base station 110 communicates a downlink TPC command 211 in a downlink timeslot 281 in a sequence of downlink timeslots 280 without communicating downlink TPC commands in downlink timeslots 282, 283 in the sequence of downlink timeslots 280. It should be appreciated that the neighboring base station 120 may also communicate one or more downlink TPC commands in one or more of the downlink timeslots 281, 282, 283 in order to, inter alia, mitigate inter-cell-interference resulting from uplink transmissions of the UE 130, and that downlink TPC command transmissions of the neighboring base station 120 are not shown in FIG. 2 for purposes of clarity and brevity.

The downlink timeslots 281, 282, 283 are mapped to uplink timeslots 291, 292, 293 (respectively) in a sequence of uplink timeslots 290. Although the sequence of downlink timeslots 280 and the sequence of uplink timeslots 290 are each depicted as including three timeslots, it should be appreciated either (or both) may include fewer timeslots (e.g., two timeslots) or more timeslots (e.g., four timeslots, six timeslots, etc.) in some implementations.

Upon receiving the downlink TPC command 211, the UE 130 generates an uplink TPC command 213 based on a received signal power level of the downlink TPC command 211, and communicates the uplink TPC command 213 in the uplink timeslot 291. The UE 130 also communicates an alternating pattern of uplink TPC commands in the uplink timeslots 292, 293, even though no downlink TPC commands are received from the serving base station 110 in the downlink timeslots 282, 283. The alternating pattern of uplink TPC commands include an uplink TPC command 222 transmitted in the uplink timeslot 292 and an uplink TPC command 223 transmitted in the uplink timeslot 293. In one embodiment, the uplink TPC command 222 has a value of zero in order to instruct the neighboring base station 120 to decrease its transmit power level by one decibel, and the uplink TPC command 223 has a value of one in order to instruct the neighboring base station 120 to increase its transmit power level by one decibel. This effectively maintains the transmit power level of the neighboring base station 120 at approximately the same level over those two timeslots. In some embodiments, the uplink TPC commands 222, 223 are ignored by the serving base station 110. In other embodiments, the uplink TPC commands 222, 223 go undetected by the serving base station 110, e.g., the serving base station 110 does not listen for the uplink TPC commands 222, 223.

Figure 3:
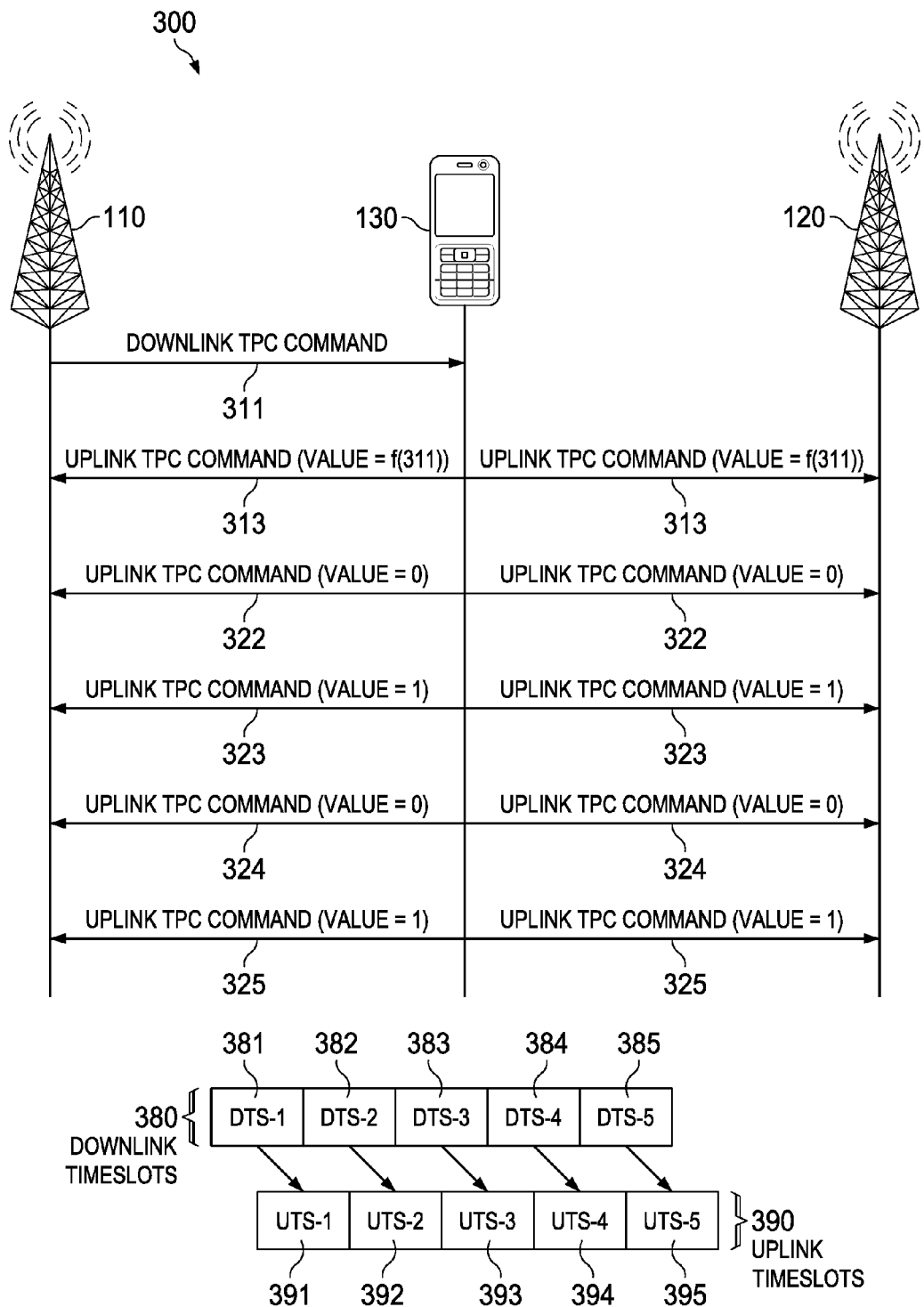
FIG. 3 illustrates a protocol diagram of another embodiment communications sequence for supporting a backwards compatible discontinuous downlink TPC command scheme.

FIG. 3 illustrates another embodiment communications sequence 300 for supporting a backwards compatible discontinuous downlink TPC command scheme. In this example, the serving base station 110 communicates a downlink TPC command 311 in a downlink timeslot 381 without communicating downlink TPC commands in downlink timeslots 382, 383, 384, 385. It should be appreciated that although the neighboring base station 120 may perform downlink TPC commands, these transmission are not shown in FIG. 3 for purposes of clarity and brevity.

The downlink timeslots 381, 382, 383, 384, 385 in the sequence of downlink timeslots 380 are mapped to uplink timeslots 391, 392, 393, 394, 395 (respectively) in the sequence of uplink timeslots 390. It should be appreciated that the sequence of downlink timeslots 380 and/or the sequence of uplink timeslots 390 may include different numbers of timeslots in some implementations.

The UE 130 generates an uplink TPC command 313 based on a received signal power level of the downlink TPC command 311, and communicates the uplink TPC command 313 in the uplink timeslot 391. The UE 130 also communicates uplink TPC commands 322, 323, 324, 325 in the uplink timeslots 392, 393, 394, 395. The uplink TPC commands 322, 323, 324, 325 form an alternating pattern of uplink TPC commands that instructs the neighboring base station 120 to alternate between decreasing and increasing its transmit power level by a fixed amount (e.g., one dB) over consecutive downlink timeslots. In one embodiment, the uplink TPC commands 322, 324 have a value of zero in order to instruct the neighboring base station 120 to decrease its transmit power level by one decibel, and the uplink TPC commands 323, 325 have a value of one in order to instruct the neighboring base station 120 to increase its transmit power level by one decibel. The uplink TPC commands 322, 323, 324, 325 may be ignored, or otherwise go undetected, by the serving base station 110.

Figure 4:
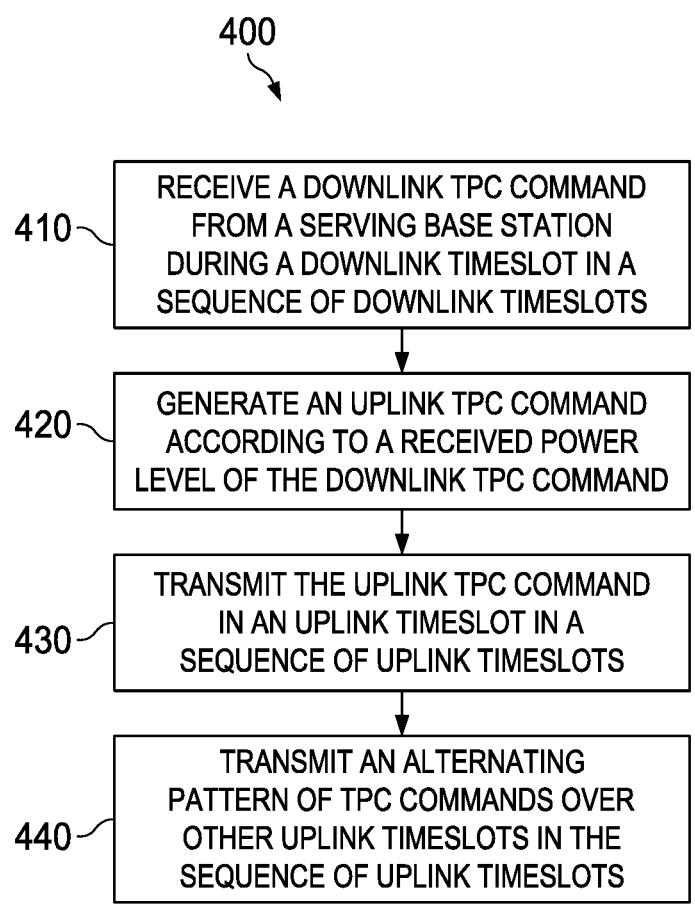
FIG. 4 illustrates a flowchart of an embodiment method for processing discontinuous downlink TPC commands.

FIG. 4 illustrates a flowchart of a method 400 for transmit power control, as may be performed by a served UE. At step 410, the served UE receives a downlink TPC command from a serving base station during a downlink timeslot in a sequence of downlink timeslots. At step 420, the served UE generates an uplink TPC command according to a received power level of the downlink TPC command. At step 430, the served UE transmits the uplink TPC command in a uplink timeslot in a sequence of uplink timeslots. The first uplink timeslot maps to the downlink timeslot over which the downlink TPC command was received. At step 440, the served UE transmits an alternating pattern of TPC commands over other uplink timeslots in the sequence of uplink timeslots. The alternating pattern of TPC commands instructs neighboring legacy base stations in incrementally increase and decrease their transmit power levels by a fixed amount, thereby effectively maintaining their power levels when downlink TPC commands are not being communicated from the serving base station to the served UE.

Figure 5:
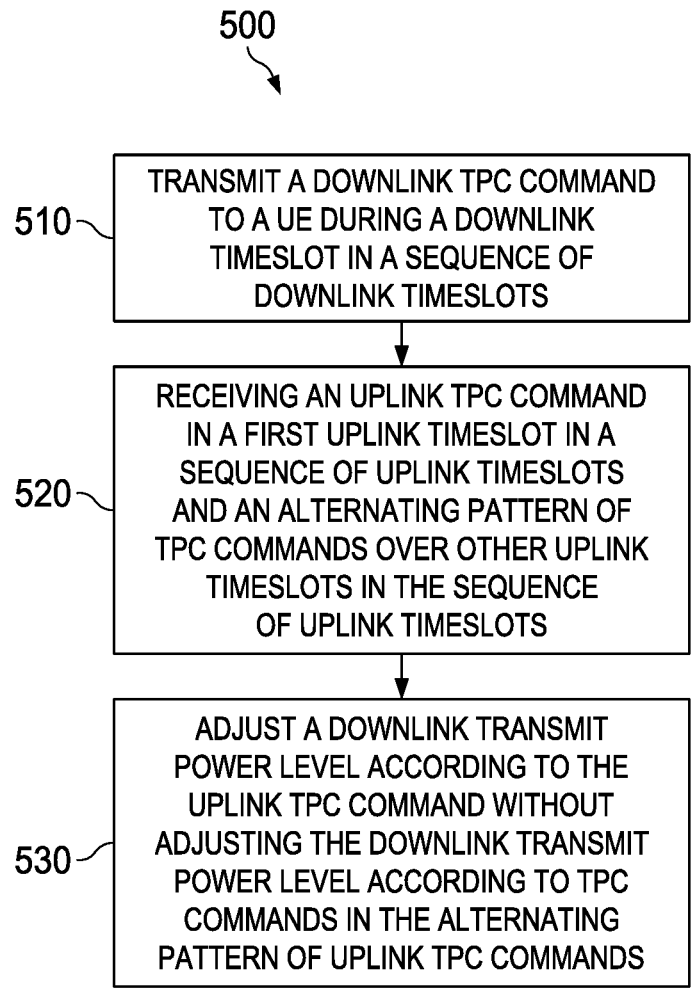
FIG. 5 illustrates a flowchart of an embodiment method for communicating discontinuous downlink TPC commands.

FIG. 5 illustrates a flowchart of a method 500 for transmit power control, as may be performed by a serving base station. At step 510, the serving base station transmits a downlink TPC command to a UE during a downlink timeslot in a sequence of downlink timeslots. At step 520, the serving base station receives an uplink TPC command in an uplink timeslot in a sequence of uplink timeslots and an alternating pattern of TPC commands over other uplink timeslots in the sequence of uplink timeslots. The uplink timeslot over which the uplink TPC command is received maps to the downlink timeslot over which the downlink TPC command was transmitted. At step 530, the serving base station adjusts a downlink transmit power level according to the uplink TPC command without adjusting the downlink transmit power level according to TPC commands in the alternating pattern of uplink TPC commands.

Embodiments of the disclosure maintain backwards compatibility problem by transmitting an alternating pattern of uplink TPC commands in uplink timeslots that are not mapped to a downlink timeslot over which a downlink TPC command was transmitted.

Embodiments of the disclosure address the above-mentioned backwards compatibility problem by transmitting an alternating pattern of uplink TPC commands in uplink timeslots that are not mapped to a downlink timeslot over which a downlink TPC command was transmitted.

Some TPC commands may utilize discontinuous transmission (DTX) schemes to control transmit power. Embodiments described herein utilize patterns of downlink (DL) TPC commands to achieve downlink power control when discontinuous (DTX) uplink TPC commands are communicated in a fractional dedicated physical channel (F-DPCH). Embodiments may be used to support DTX DL TPC over one radio link, as well as over multiple radio links.

Figure 6:
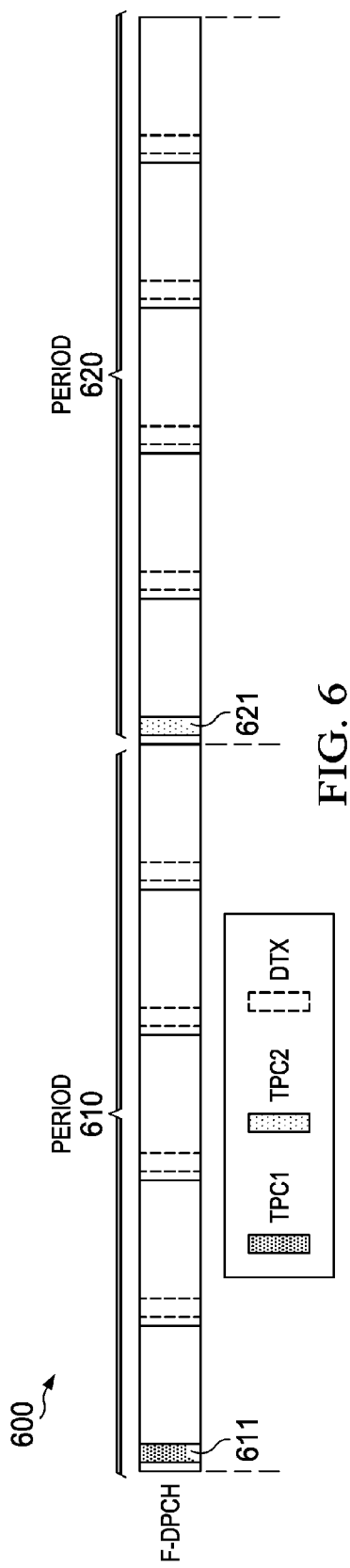
FIG. 6 illustrates an embodiment fractional dedicated physical channel (F-DPCH) configuration for supporting DTX TPC on a single radio link.

Aspects of this disclosure provide techniques for supporting DTX UL TPC on a single radio link. FIG. 6 illustrates an embodiment F-DPCH configuration 600 for supporting DTX UL TPC on a single radio link. As shown, embodiment F-DPCH configuration 600 includes a period 610 and a period 620, with each of the periods 610, 620 having N slots. In this example, the periods 610, 620 include 5 slots, but it should be appreciated that a period in an F-DPCH may have any number of slots.

In this example, a single TPC command 611 is transmitted in the first slot of the period 610, while a single period 621 is transmitted in the first slot of the period 620. The other slots in the periods 610, 620 do not carry TPC commands. As a result, TPC commands are transmitted in a discontinuous fashion in the F-DPCH configuration 600.

Figure 7:
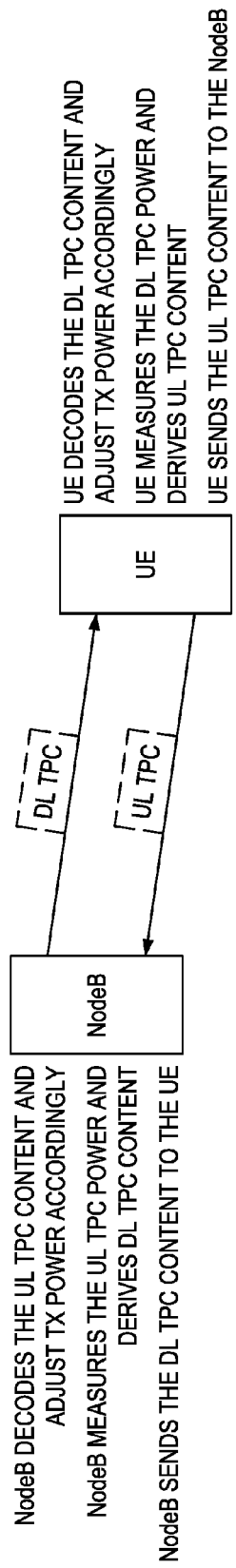
FIG. 7 illustrates a network in which a NodeB and a UE exchange TPC commands in order to achieve power control over a radio link.

TPC commands may be exchanged between base stations and mobile devices to achieve uplink and downlink power control. FIG. 7 illustrates a network in which a NodeB and a UE exchange uplink (UL) TPC and downlink (DL) TPC commands in order to achieve power control over a radio link. The DL TPC command be used to adjust uplink transmit power at the UE, while the UL TPC command may be used to adjust downlink transmit power at the NodeB. In one example, the UE decodes the received DL TPC command, and adjusts uplink transmit power based on the decoded content. The UE then measures a received power level of the DL TPC command, and then communicates the received power level in the UL TPC command. The NodeB decodes the UL TPC command, and uses the content (e.g., the received power level at the UE) to adjust downlink transmit power. The NodeB then measures a received power level of the UL TPC command, and communicates the received power level of the UL TPC command in the DL TPC command.

In DTX TPC schemes, the UL TPC is not communicated in every slot, which raises the problem of what content the UE includes in the UL TPC after receiving a slot that does not carry an UL TPC. Aspects of this disclosure address that problem.

In some embodiments, the UE transmits UL TPC commands according to a pattern that signals to the NodeB to either increase or decrease the NodeB's downlink transmit power level. Each UL TPC command may signal either an increase or decrease the downlink transmit power level, and the different patterns of UL TPC commands transmitted for a given period may determine whether the NodeB increases or decreases the downlink transmit power level.

In one embodiment, the number of TPC commands indicating an increase, or decrease, in the downlink transmit power level governs how the overall pattern is interpreted. When the pattern of UL TPC commands transmitted by the UE includes more TPC commands signaling an increase in the downlink transmit power, than UL TPC commands signaling a decrease in the downlink transmit power, the NodeB will increase its downlink transmit power level. For example, if the pattern includes at least one more TPC command signaling an increase in the transmit power level, than a decrease in the transmit power level, then the pattern as a whole is interpreted by the NodeB as signaling an increase in the downlink transmit power level. Alternatively, when the pattern of UL TPC commands transmitted by the UE includes more TPC commands signaling a decrease in downlink transmit power, than UL TPC commands signaling an increase in downlink transmit power, then the NodeB will decrease its downlink transmit power level. For example, if the pattern includes at least one more TPC command signaling a decrease in the transmit power level, than an increase in the transmit power level, then the pattern as a whole is interpreted by the NodeB as signaling a decrease in the downlink transmit power level.

In another embodiment, a specific TPC command, or set of TPC commands, in the pattern governs how the overall pattern is interpreted by the eNodeB. In one example, the first and second TPC commands in the pattern determine how the pattern as a whole is interpreted. In that example, if a TPC pattern indicating a "1" signals an increase and a TPC pattern indicating a "0" signals a decrease, then a pattern of "11xxx" would signal to the NodeB to increase the downlink transmit power level, while a pattern of "00xxx" would signal to the NodeB to decrease the downlink transmit power level, irrespective of the contents of the third, fourth, and fifth TPC commands. The TPC commands not following the meaning of the pattern can also be a sub-pattern in this case. In the above example, the third, fourth, and fifth TPC commands may be fixed to "101", regardless of the meaning of the 5-slot pattern (e.g., "00101" would signal a decrease, while "11101" would signal an increase). Alternatively, in the above example, the third, fourth, and fifth TPC commands may have different patterns based on the instruction conveyed by the overall pattern. For instance, the third, fourth, and fifth TPC commands may be set to "011" when the pattern signals an increase, and "100" when the pattern signals a decrease, in which case a pattern of "11011" would signal an increase, while "00100" would signal an increase.

In another embodiment, the slot location of a specific TPC command may govern how the overall pattern is interpreted.

Figure 8:
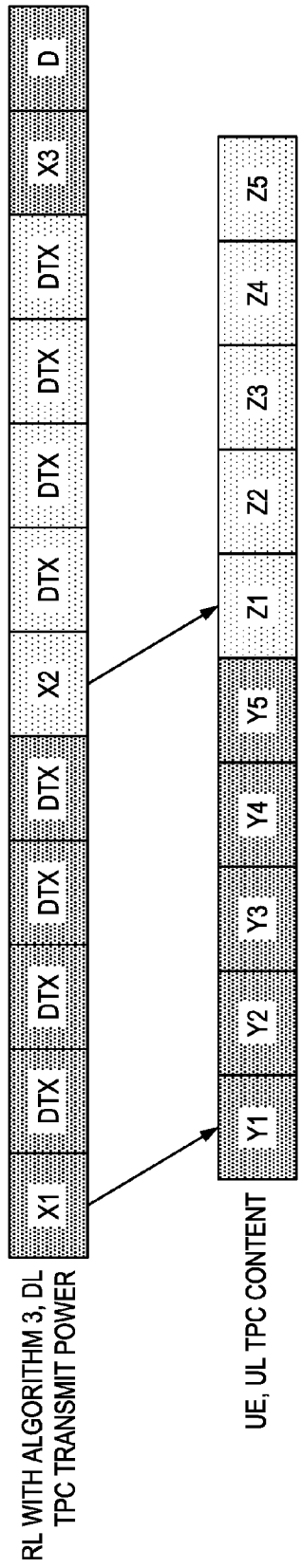
FIG. 8 illustrates an embodiment TPC command configuration for a single radio link.

In the following embodiments, it is assumed that a TPC pattern indicating a "1" signals an increase and a TPC pattern indicating a "0" signals a decrease. FIG. 8 illustrates an embodiment TPC command configuration for DTX TPC on a single radio link. In this example, the UE transmits UL TPC commands in all slots of a given period, while the NodeB transmits UL TPC commands in fewer than all slots of the period. The UL TPC commands of a given period form a pattern that is interpreted by the NodeB as an instruction to either increase or decrease the transmit power. The UE may determine which pattern of UL TPC commands Y1, Y2, Y3, Y4, Y5 after measuring the received power level of the UL TPC command X1. Likewise, The UE may determine which pattern of UL TPC commands Z1, Z2, Z3, Z4, Z5 after measuring the received power level of the DL TPC command X2.

In one embodiment, the number of TPC commands indicating an increase, or decrease, in the downlink transmit power level governs how the overall pattern is interpreted. For example, a pattern of "11100" would signal to the NodeB to increase the downlink transmit power level, while a pattern of "00011" would signal to the NodeB to decrease the downlink transmit power level.

In another embodiment, a specific TPC command, or set of TPC commands, in the pattern governs how the overall pattern is interpreted by the eNodeB. For example, if the first and second TPC commands in the pattern determine how the pattern as a whole is interpreted, then a pattern of "11xxx" would signal to the NodeB to increase the downlink transmit power level.

The patterns may be predefined, which may allow the NodeB to determine whether to "increase" or "decrease" without additional signaling. This may be more reliable than relying on one UL TPC to determine whether to "increase" or "decrease" the power. It may also increase stability in the transmit power, as the NodeB may only increase/decrease the power by one step after each period.

Figure 9:
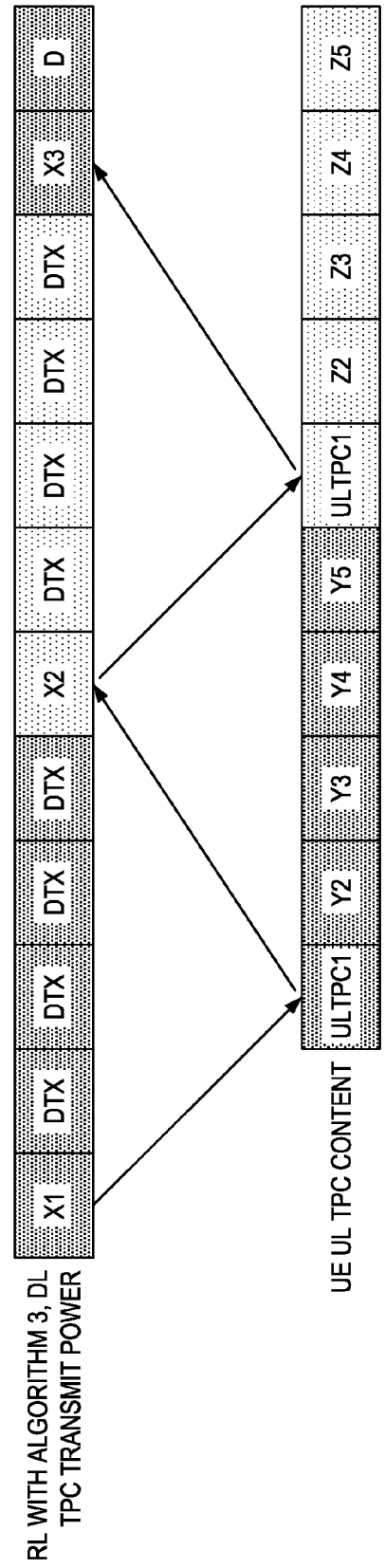
FIG. 9 illustrates another embodiment TPC command configuration for a single radio link.

FIG. 9 illustrates another embodiment TPC command configuration for DTX TPC on a single radio link. In one example, the slot location of a specific TPC command governs how the overall pattern is interpreted. In another example, the pattern can be predefined to have the meaning of "increase" or "decrease". For example, "1100" means "increase", and taking an inversion, "0011" means "decrease". The benefit of this embodiment is that if there are multiple cells receiving the UL TPCs sent from the UE, their DL TPC transmit power will be stable, because they will only increase/decrease their power by one step after each period.

Figure 10:
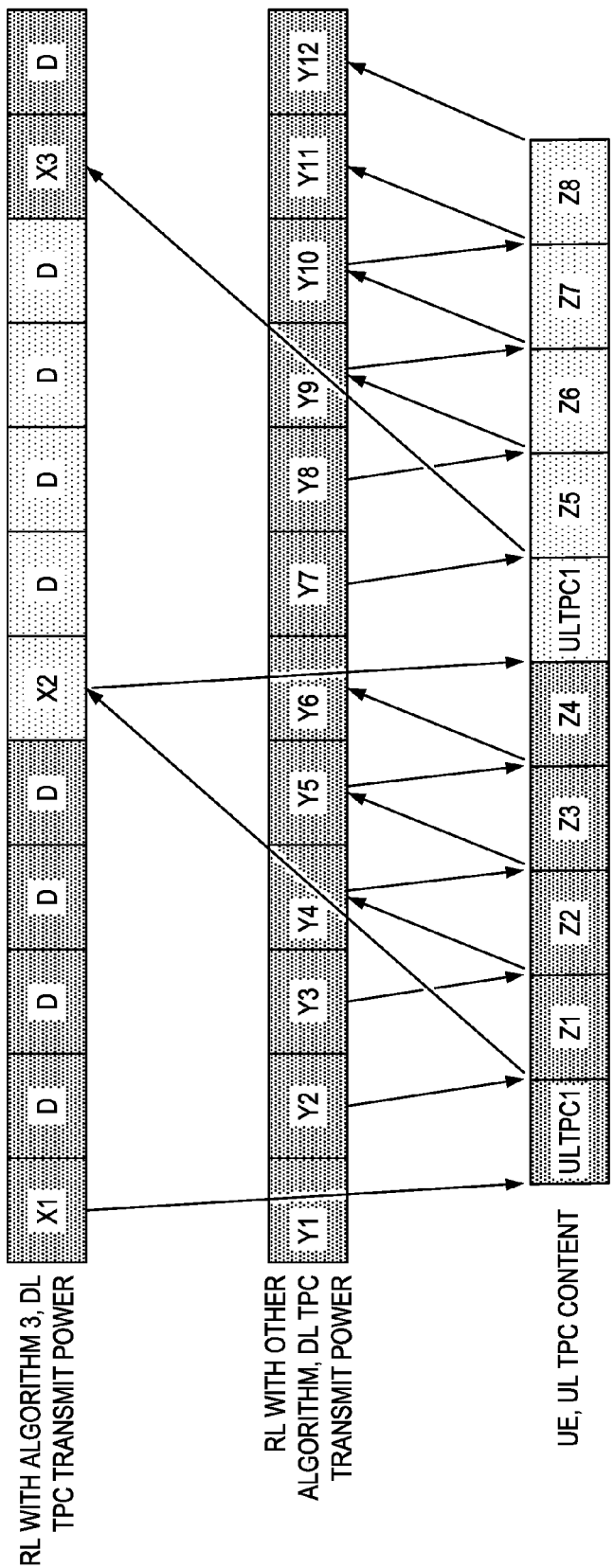
FIG. 10 illustrates an embodiment TPC command configuration for multiple radio links.

FIG. 10 illustrates an embodiment TPC command configuration for DTX TPC with multiple radio links (RLs). In this example, one radio link is configured with Algorithm 3 for power control (RL1), and the other link is not configured with Algorithm 3 (RL2). For the RL not configured with Algorithm 3, the DL TPC is transmitted every slot. The UE derives the UL TPC content in the slot where the DL transmission occurred from the RL configured with Algorithm 3 (with Algorithm 3 the DL TPC is only sent in the first slot of the five slot frame, slots labeled as "X1", "X2" in FIG. 10), and sends it in one uplink slot. If Algorithm 3 DL TPC is not transmitted (as in slots labeled with "D"), the UE derives the UL TPC content from the signal transmitted by RL2, and sends it in the uplink. It can be seen that only the content in the uplink slot labeled as "UL TPC1" is derived according to the power of the RL with Algorithm 3. For other uplink slots, labeled as "Z1", "Z2", "Z3'", "Z4", the content of UL TPC is derived according to the power of the RL not configured with Algorithm 3 which transmits the DL TPC command every slot. The RL configured with Algorithm 3 and carrying the information used in the derivation in the slot "UL TPC1" may belong to the serving HS-DSCH cell. The RL not configured with Algorithm 2 carrying other Algorithm's DL TPC for the derivation of UL TPCs in the other slots may belong to a predetermined cell. The predetermined cell may be designated by the network via higher layer signaling from the RNC, the serving cell, or cell assisting the serving cell. The benefit of this embodiment is that the UE is able to power control the DL TPC power on two different RLs.

Aspects of this disclosure provide techniques for configuration in which multiple RLs send DL TPC commands to a UE. In one example, the UE measures a received power of an DL TPC command according to Algorithm 3, and then communicates the measurement in a UL TPC command via an uplink slot (e.g., one uplink slot) after measuring the DL TPC command. In that example, the DL TPC command may correspond to a RL of a serving High Speed Downlink Shared CHannel (HS-DSCH) cell, a RL designated by the network, a RL of an E-DCH decoupling cell, or a RL of an assisting serving cell. In uplink slots where the Algorithm 3 DL TPC is not transmitted, the UE may derives UL TPC command content according to a received power of an DL TPC sent from a second RL that sends DL TPC commands continuously in every slot. The second RL may belong to the serving HS-DSCH cell, be designated by the network, e.g., radio network controller (RNC), belong to the serving enhanced dedicated channel (E-DCH) cell, or belong to an assisting serving cell.

Embodiments may allow offloading based on radio link conditions in the serving and candidate cells. Offloading may be UE specific not cell-specific. Embodiments may be implemented in Universal Mobile Telecommunications System (UMTS) networks.

Figure 11:
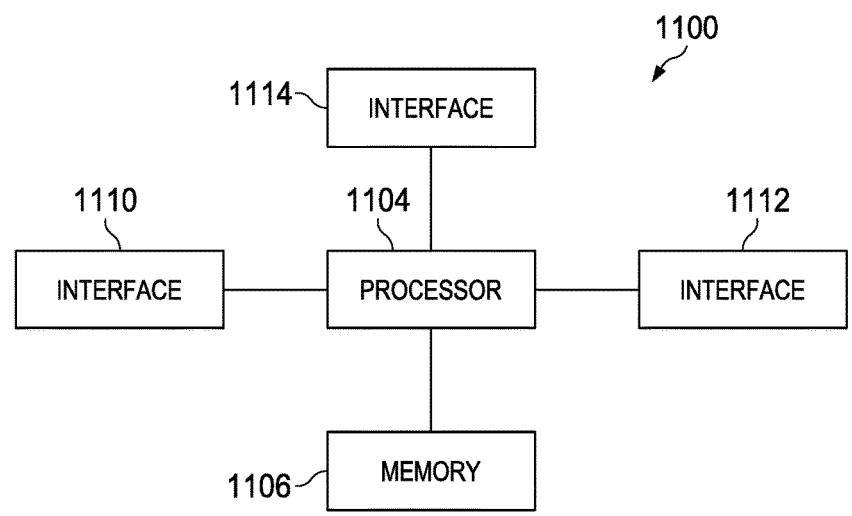
FIG. 11 illustrates a diagram of an embodiment processing system.

FIG. 11 illustrates a block diagram of an embodiment processing system 1100 for performing methods described herein, which may be installed in a host device. As shown, the processing system 1100 includes a processor 1104, a memory 1106, and interfaces 1110-1114, which may (or may not) be arranged as shown in FIG. 11. The processor 1104 may be any component or collection of components adapted to perform computations and/or other processing related tasks, and the memory 1106 may be any component or collection of components adapted to store programming and/or instructions for execution by the processor 1104. In an embodiment, the memory 1106 includes a non-transitory computer readable medium. The interfaces 1110, 1112, 1114 may be any component or collection of components that allow the processing system 1100 to communicate with other devices/components and/or a user. For example, one or more of the interfaces 1110, 1112, 1114 may be adapted to communicate data, control, or management messages from the processor 1104 to applications installed on the host device and/or a remote device. As another example, one or more of the interfaces 1110, 1112, 1114 may be adapted to allow a user or user device (e.g., personal computer (PC), etc.) to interact/communicate with the processing system 1100. The processing system 1100 may include additional components not depicted in FIG. 11, such as long term storage (e.g., non-volatile memory, etc.).

In some embodiments, the processing system 1100 is included in a network device that is accessing, or part otherwise of, a telecommunications network. In one example, the processing system 1100 is in a network-side device in a wireless or wireline telecommunications network, such as a base station, a relay station, a scheduler, a controller, a gateway, a router, an applications server, or any other device in the telecommunications network. In other embodiments, the processing system 1100 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 12:
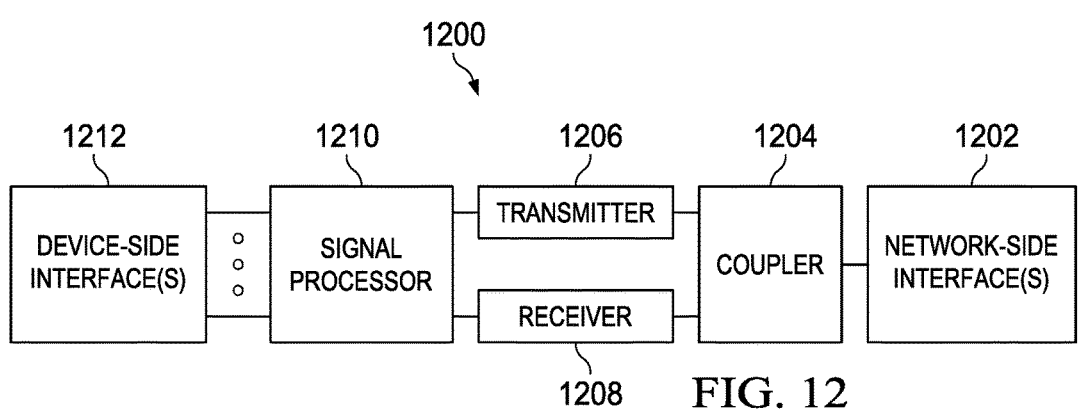
FIG. 12 illustrates a diagram of an embodiment transceiver.

In some embodiments, one or more of the interfaces 1110, 1112, 1114 connects the processing system 1100 to a transceiver adapted to transmit and receive signaling over the telecommunications network. FIG. 12 illustrates a block diagram of a transceiver 1200 adapted to transmit and receive signaling over a telecommunications network. The transceiver 1200 may be installed in a host device. As shown, the transceiver 1200 comprises a network-side interface 1202, a coupler 1204, a transmitter 1206, a receiver 1208, a signal processor 1210, and a device-side interface 1212. The network-side interface 1202 may include any component or collection of components adapted to transmit or receive signaling over a wireless or wireline telecommunications network. The coupler 1204 may include any component or collection of components adapted to facilitate bi-directional communication over the network-side interface 1202. The transmitter 1206 may include any component or collection of components (e.g., up-converter, power amplifier, etc.) adapted to convert a baseband signal into a modulated carrier signal suitable for transmission over the network-side interface 1202. The receiver 1208 may include any component or collection of components (e.g., down-converter, low noise amplifier, etc.) adapted to convert a carrier signal received over the network-side interface 1202 into a baseband signal. The signal processor 1210 may include any component or collection of components adapted to convert a baseband signal into a data signal suitable for communication over the device-side interface(s) 1212, or vice-versa. The device-side interface(s) 1212 may include any component or collection of components adapted to communicate data-signals between the signal processor 1210 and components within the host device (e.g., the processing system 1100, local area network (LAN) ports, etc.).

The transceiver 1200 may transmit and receive signaling over any type of communications medium. In some embodiments, the transceiver 1200 transmits and receives signaling over a wireless medium. For example, the transceiver 1200 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1202 comprises one or more antenna/radiating elements. For example, the network-side interface 1202 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1200 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for communicating transmit power control (TPC) commands, the method comprising:
   receiving, by a user equipment (UE), a downlink TPC command from a serving base station during a first downlink timeslot in a sequence of downlink timeslots;
   generating an uplink TPC command according to a received power level of the downlink TPC command;
   transmitting, by the UE, the uplink TPC command in a first uplink timeslot in a sequence of uplink timeslots, the first uplink timeslot being mapped to the first downlink timeslot in which the downlink TPC command was received from the serving base station; and
   transmitting, by the UE, an alternating pattern of TPC commands over other uplink timeslots in the sequence of uplink timeslots.

2. The method of claim 1, wherein the other uplink timeslots are mapped to downlink timeslots that do not carry downlink TPC commands from the serving base station.

3. The method of claim 1, wherein the alternating pattern of TPC commands instructs a neighboring base station to alternate between increasing and decreasing a downlink transmit power level of the neighboring base station by a fixed amount during consecutive downlink timeslots.

4. The method of claim 3, wherein the uplink TPC command instructs the neighboring base station to adjust the downlink transmit power level based on the received power level of the downlink TPC command during a second downlink timeslot in the sequence of downlink timeslots, the second downlink timeslot preceding the consecutive downlink timeslots.

5. The method of claim 1, wherein the alternating pattern of TPC commands are not dependent on power levels of downlink TPC commands received by the UE.

6. The method of claim 5, wherein the alternating pattern of TPC commands are not dependent on the instruction conveyed by the uplink TPC command.

7. The method of claim 1, wherein the uplink TPC command and the alternating pattern of TPC commands are communicated over an uplink Dedicated Physical Control Channel (DPCCH).

8. The method of claim 1, wherein the first downlink timeslot is preceded by at least one other timeslot in the sequence of downlink timeslots.

9. The method of claim 1, wherein the first downlink timeslot precedes all other downlink timeslots in the sequence of downlink timeslots.

10. A user equipment (UE) comprising:
    a processor; and
    a non-transitory computer readable storage medium storing programming for execution by the processor, the programming including instructions to:
    receive a downlink TPC command from a serving base station during a first downlink timeslot in a sequence of downlink timeslots;
    generate an uplink TPC command according to a received power level of the downlink TPC command;
    transmit the uplink TPC command in a first uplink timeslot in a sequence of uplink timeslots, the first uplink timeslot being mapped to the first downlink timeslot in which the downlink TPC command was received from the serving base station; and
    transmit an alternating pattern of TPC commands over other uplink timeslots in the sequence of uplink timeslots.

11. The UE of claim 10, wherein the other uplink timeslots are mapped to downlink timeslots that do not carry downlink TPC commands from the serving base station.

12. The UE of claim 10, wherein the alternating pattern of TPC commands instructs a neighboring base station to alternate between increasing and decreasing a downlink transmit power level of the neighboring base station by a fixed amount during consecutive downlink timeslots.

13. The UE of claim 12, wherein the uplink TPC command instructs the neighboring base station to adjust the downlink transmit power level based on the received power level of the downlink TPC command during a second downlink timeslot in the sequence of downlink timeslots, the second downlink timeslot preceding the consecutive downlink timeslots.

14. The UE of claim 10, wherein the alternating pattern of TPC commands are not dependent on power levels of downlink TPC commands received by the UE.

15. The UE of claim 14, wherein the alternating pattern of TPC commands are not dependent on the instruction conveyed by the uplink TPC command.

16. The UE of claim 10, wherein the first downlink timeslot is preceded by at least one other timeslot in the sequence of downlink timeslots.

17. The UE of claim 10, wherein the first downlink timeslot precedes all other downlink timeslots in the sequence of downlink timeslots.

18. A method for generating transmit power control (TPC) commands in an uplink Dedicated Physical Control Channel (DPCCH) when a serving radio link is configured with Algorithm 3, the method comprising:
   receiving, by a user equipment (UE), a downlink TPC command over the serving radio link;
   generating, by the UE, one uplink TPC command based on the downlink TPC command and transmitting the one uplink TPC command in a first timeslot in a sequence of timeslots; and
   generating, by the UE, a pattern of uplink TPC commands and transmitting the pattern of uplink TPC commands in other timeslots following the sequence of timeslots, wherein when a length of a slot cycle is 3, then the pattern of uplink TPC commands consists of a first TPC command having a value of 0 followed by a second TPC command having a value of 1, and wherein when a length of a slot cycle is 5, then the pattern of uplink TPC commands consists of a first TPC command having a value of zero, followed by a second TPC command having a value of 1, followed by a third TPC command having a value of 0, followed by a fourth TPC command having a value of 1.

19. A method for adjusting downlink transmit power levels, the method comprising:
   transmitting, by a serving base station, a downlink TPC command to a user equipment (UE) during a first downlink timeslot in a sequence of downlink timeslots;
   receiving, by the serving base station, an uplink TPC command in a first uplink timeslot in a sequence of uplink timeslots and an alternating pattern of TPC commands over other uplink timeslots in the sequence of uplink timeslots, the first uplink timeslot being mapped to the first downlink timeslot over which the downlink TPC command was transmitted; and
   adjusting a downlink transmit power level of the serving base station according to the uplink TPC command without adjusting the downlink transmit power level according to TPC commands in the alternating pattern of TPC commands received over the other uplink timeslots.

20. The method of claim 19, wherein the other uplink timeslots are mapped to downlink timeslots that do not carry downlink TPC commands from the serving base station.

* * * * *